United States Patent [19]

Komai et al.

[11] Patent Number: 5,734,025
[45] Date of Patent: Mar. 31, 1998

[54] ADSORBENT FOR CELLULAR FIBRONECTIN, A METHOD FOR FRACTIONAL PURIFICATION OF FIBRONECTIN AND A METHOD OF HEMOCATHARISIS

[75] Inventors: Takashi Komai, Hisai; Keiichi Miyashita, Naruto; Eiji Sakashita; Hiroshi Kamogawa, both of Tokushima-ken; Fujio Inoue, Naruto; Soichiro Takenishi, Adachi-ku, all of Japan

[73] Assignee: Otsuka Pharmaceutical Factory, Inc., Tokushima, Japan

[21] Appl. No.: 628,343

[22] Filed: Apr. 5, 1996

Related U.S. Application Data

[63] Continuation of Ser. No. 244,494, May 25, 1994, Pat. No. 5,561,114.

[30] Foreign Application Priority Data

Sep. 25, 1992 [JP] Japan .................. 4-255199

[51] Int. Cl.$^6$ .......................... C07K 1/16; C07K 14/745; C08B 5/14
[52] U.S. Cl. .......................... 530/417; 530/382; 530/412; 536/56; 536/122
[58] Field of Search .......................... 514/8, 12, 21; 530/380, 381, 382, 412, 415, 417, 829, 830, 395; 536/56, 122, 124; 106/163.1; 435/2

[56] References Cited

U.S. PATENT DOCUMENTS

| | | | |
|---|---|---|---|
| 3,563,241 | 2/1971 | Evans | 604/364 |
| 3,673,110 | 6/1972 | Edwards | 510/513 |
| 3,804,092 | 4/1974 | Tunc | 604/364 |
| 4,389,523 | 6/1983 | Okajima et al. | 536/59 |
| 4,744,899 | 5/1988 | Tani et al. | 210/263 |
| 5,324,823 | 6/1994 | Asakawa et al. | 530/415 |
| 5,561,114 | 10/1996 | Komai et al. | 514/21 |

OTHER PUBLICATIONS

The Jounral of Biological Chemistry, vol. 260, No. 8, Apr. 25, 1985, pp. 5105–5114, "Differences in Domain Structure between Human Fibronectins Isolated from Plasma and from Culture Supernatants of Normal and Transformed Fibroblasts", Kiyotoshi Sekiguchi et al.

*Primary Examiner*—Nancy Degen
*Attorney, Agent, or Firm*—Sughrue, Mion, Zinn, Macpeak & Seas, PLLC

[57] ABSTRACT

This invention provides a selective cellular fibronectin (cFN) adsorbent utilizing a nonwoven cellulose sulfate fabric and a method for fractional purification of FN which-comprises contacting an FN matter containing both plasma fibronectin (pFN) and cellular fibronectin (cFN) with the nonwoven cellulose sulfate fabric to separate pFN and cFN from each other. By the fractional purification method of the invention, cFN and pFN can be fractionated in an expedient manner and with high efficiency and both pFN and cFN can be recovered in high purity and good yield.

3 Claims, No Drawings

SEQUENCE LISTING ( 1 ) GENERAL INFORMATION:

( i i i ) NUMBER OF SEQUENCES: 2

( 2 ) INFORMATION FOR SEQ ID NO: 1:

( i ) SEQUENCE CHARACTERISTICS:
( A ) LENGTH: 24 base pairs
( B ) TYPE: nucleic acid
( C ) STRANDEDNESS: single
( D ) TOPOLOGY: linear ( i i ) MOLECULE TYPE: DNA (genomic)

( x i ) SEQUENCE DESCRIPTION: SEQ ID NO: 1:

TCTCGGAATT CCATCACCCT CACC 24

( 2 ) INFORMATION FOR SEQ ID NO: 2:

( i ) SEQUENCE CHARACTERISTICS:
( A ) LENGTH: 24 base pairs
( B ) TYPE: nucleic acid
( C ) STRANDEDNESS: single
( D ) TOPOLOGY: linear ( i i ) MOLECULE TYPE: DNA (genomic)

( x i ) SEQUENCE DESCRIPTION: SEQ ID NO: 2:

GGGGAGCTCC GAGCATTGTC ATTC 24

ADSORBENT FOR CELLULAR FIBRONECTIN, A METHOD FOR FRACTIONAL PURIFICATION OF FIBRONECTIN AND A METHOD OF HEMOCATHARISIS

This is a continuation of application Ser. No. 08/244,494, filed May 25, 1994, now U.S. Pat. No. 5,561,114.

TECHNICAL FIELD

The present invention relates to a selective adsorbent for cellular fibronectin (cFN) and a technology for fractional purification of fibronectin (FN), particularly a method for fractionating an FN matter containing both plasma fibronectin (pFN) and cFN into pFN and cFN and a method of hemocatharisis comprising eliminating cFN from blood by the above method.

BACKGROUND ART

Fibronectin (FN) was first reported by Morrison et al. [Morrison, P. R. et al., J. Am. Chem. Soc., 70, 3103 (1948)] as one of plasma proteins in 1948. Being a multifunctional protein broadly distributed in various tissues and body fluids, this substance is known to be involved, as a cell adhesion factor, in a large variety of biological events such as the migration, differentiation, proliferation and canceration of cells [Sekiguchi, K.: Cell Engineering, 4 (6), 485–497 (1985)].

Meanwhile, FN as it is synthesized in the liver and occurring in the blood is known as plasma FN (pFN), and FN as it is detected on the tissue and cell surfaces is called cellular FN (cFN) [Sekiguchi et al., J. Biol. Chem., 260 (8) 5105–5114 (1985)]. It has been shown that these species of FN are subject to molecular diversity due to alternative splicing of the early gene transcription product. As the regions subject to such alternative splicing, there are three regions called EDA, EDB and IIIcs, and it is believed that a large number of molecular species occur according to varied combinations of expression of these regions. In pFN, the above-mentioned EDA and EDB regions have not been appreciably expressed. On the other hand, cFN is an FN with a high degree of expression of said EDA region. Peters J. H. et al. conjugated a peptide having 29 amino acids with keyhole limpet hemocyanin (KLH) to prepare an immunogen, constructed an anti-cFN polyclonal antibody specifically reactive to cFN having the EDA region, and using the antibody, demonstrated that the normal human blood contains traces of cFN and that the blood cFN level is markedly elevated in patients with collagen disease accompanied by vasculitis [Am. Rev. Respir. Dis., 138, 167–174 (1988); J. Lab. Clin. Med., 113 (5), 586–597 (1989)]. According to the above report of Peters et al., the physiological implications of increased blood cFN in patients with collagen disease accompanied by vasculitis are not definitely known but a correlation between the stage or severity of disease and the blood concentration of cFN is suggested.

The investigation made by the inventors of the present invention revealed that whereas the plasma concentration of cFN in healthy humans is 1 to 2 µg/ml, it is as high as 10 and odd µg/ml in patients-with various diseases. On the other hand, pFN is invariably within the normal range of 270 to 400 µg/ml, irrespective of subjects.

Therefore, it is a subject of intriguing interest to investigate how the course of disease is modified by selective elimination of cFN from the blood of patients with collagen disease presenting with abnormal elevations of cFN. The recent study by the inventors of the present invention uncovered that when the plasma of a patient with rheumatoid arthritis is subjected to cryofiltration, cFN is partially removed from the plasma, resulting in relief of the symptoms. However, the cryofiltration procedure is disadvantageous in that it involves discarding of the useful plasma protein in large quantities and is not capable of selective elimination of cFN.

The inventors of the present invention previously developed a method for separating and eliminating cFN selectively from the patient's blood and a selective cFN adsorbent for the elimination thereof and filed a patent application (PCT/JP92/00359). It was, however, subsequently discovered that, occurring as granules or gels, the cFN adsorbent disclosed in the above application has the drawback that it incurs a high production cost, must be maintained in wet condition and, in packing it into an adsorption module column for extra-corporeal circulation, must be handled as floated on water.

In view of the above disadvantages, the inventors conducted further intensive research and established a high-sensitivity protocol for assay of cFN using a previously developed monoclonal antibody which recognizes the amino acid sequence of the EDA region of FN. The inventors further discovered that a nonwoven fabric made of cellulose sulfate fiber has a selective affinity for cFN. Thus, it was discovered that such a nonwoven cellulose sulfate fabric adsorbs cFN and, because of its difference in affinity between cFN and pFN, adsorbs cFN with greater specificity. Based on these findings, the inventors further explored and developed a new technology which enabled fractionation between pFN and cFN. The present invention has been developed on the basis of the above findings.

DISCLOSURE OF INVENTION

The present invention is accordingly directed to a cFN adsorbent comprising a nonwoven cellulose sulfate fabric, a method for fractional purification of FN characterized by contacting an FN material containing both pFN and cFN with said adsorbent to thereby fractionate it into pFN and cFN, and a hemocatharisis method characterized by contacting a cFN adsorbent comprising a nonwoven cellulose sulfate fabric with the blood to thereby eliminate cFN from the blood.

The FN material, which is the object of treatment according to the invention, may be any material that contains both pFN and cFN. Typically, it includes the blood, plasma, serum, extracts of various organs in which the existence of FN has been established, and FN fractions derived from fibroblast and other cultures. Preferred, among them, is the blood (plasma and serum) of patients with various diseases known to be accompanied by elevation of blood cFN, such as rheumatoid arthritis, systemic lupus erythematosus, progressive systemic sclerosis, polymyositis, giant cell arteritis, poly-myalgia rheumatica, polyarteritis nodosa, chronic renal failure and so on.

The cFN adsorbent of the present invention comprises a nonwoven cellulose sul fate fabric and the fractional purification method of the invention comprises contacting an FN material with said adsorbent.

The nonwoven cellulose sulfate fabric for use as the adsorbent of the present invention can be provided by whichever of (1) the process comprising previous sulfating cellulose fiber and constructing a nonwoven fabric using the so-sulfated fiber in the usual manner and (2) the process comprising sulfating a nonwoven fabric made of cellulose in a suitable manner. The sulfation technology and the technology for constructing a nonwoven fabric are now described in detail, taking the above process (1) as an example. When the process (2) is employed, the sulfation step and the step for constructing a nonwoven fabric can be practiced simply in the reverse order.

To begin with, the sulfation of cotton and of a yarn, cloth, nonwoven fabric or the like of cotton fiber is already known from several publications. As representative sulfating agents for cellulose, there can be mentioned chlorosulfonic acid [cf. B. Philipp, W. Wagenknecht, Cell. Chem. Technol., 17, 443 (1983) etc.], pyridine-SO₃ complex (cf. the above literature), DMF-SO₃complex [cf. Rothschild, A. M. and Castania, A., J. Pharm. Pharmac., 20, 77 (1968), etc.], and piperidine N-sulfate [cf. Nakashima, Y. et al., Jpn. Cancer Res. (Gann), 78, 1164 (1987) etc.], among others.

Irrespective of which of the above known methods is employed, cellulose sulfate fibers containing sulfur in the range of 0 to about 20 weight % and having sulfation or DS (degree of substitution) values within the range of 0 to 2.9 can be selectively obtained. The weight % in regard to sulfur weight is defined as sulfur weight (g)/sample weight (g)× 100 and can be determined in accordance with JIS K0103. On the other hand, the degree of sulfation or substitution (DS) is expressed by the following equation.

$$DS(-SO_3Na)=1.62\times(S\%)/32-1.02\times(S\%)$$

DS, mentioned above, is an index representing the number of OH groups, among 3 OH groups per glucose residue, which are substituted.

Since highly sulfated species of the cellulose sulfate fiber obtainable by the above methods are water-soluble, they are not so suitable for the nonwoven fabric of the invention. The degree of substitution (DS) of cellulose sulfate fiber suitable for the nonwoven fabric of the invention is generally in the range of 0.01 to 1.5.

Generally when natural cellulose is sulfated beyond D.S= 0.2, it is rendered partially water-soluble. Therefore, when an uncrosslinked cellulose fiber, for example natural cotton fiber, is sulfated for use as the raw material of the nonwoven fabric of the invention, it is recommendable to control its degree of substitution within the range of about 0.01 to 0.2, preferably about 0.01 to 0.1. Thus, with a DS value over 0.2, the cellulose sulfate fiber swells remarkably in water and even partially dissolves in water so that it fails to retain its fibrous geometry and strength, thus being unsuited for purposes of the invention. Furthermore, among cellulose sulfate fibers with degrees of sulfation within the above range, the higher the degree of sulfation of the fiber, the lower is its strength in water. Therefore, the degree of sulfation for the cellulose sulfate fiber to be used should be selected in consideration of the degree of possible reduction in fiber strength and the required adsorptive capacity of the product nonwoven fabric in its application as the adsorbent of the invention.

It is possible to preclude a reduction in strength by blending cellulose sulfate fiber with untreated cotton fiber and/or other synthetic or semisynthetic fiber, e.g. nylon, polyester, rayon, etc., and processing the fiber blend into a nonwoven fabric and the nonwoven fabric of the present invention includes such nonwoven fabrics made of fiber blends.

It is also possible to produce a highly sulfated cellulose fiber, which has a high degree of sulfation and, yet, will not suffer from reductions in physical properties in water, by crosslinking cellulose fiber with a suitable crosslinking agent. Such cross-linking reaction of cellulose fiber can be carried out in the known manner. The crosslinking agent which can be employed also includes those agents well known in the art, such as formaldehyde, dimethylolureas, trimethylol-melamines, epoxy compounds, dichloroalkanes and so on. Preferred, among them, are epoxy compounds, such as epichlorohydrin, ethylene glycol diglycidyl ether, glycerin diglycidyl ether, diethylene glycol diglycidyl ether and vinylcyclohexene dioxide, to name but a few preferred species. The crosslinking of cellulose can be effected by treating the starting cellulose with an alkali, e.g. sodium hydroxide, to give the alkalinized cellulose and, then, reacting it with said crosslinking agent. This process can be easily carried out by reference to, inter alia, Kakyozai Handbook [Handbook of Crosslinking Agents] authored by Shinzo Yamashita and Tosuke Kaneko, Taiseisha, 1981. By using such a crosslinked fiber, a nonwoven fabric of still greater efficiency can be obtained and such fabric is effective as the adsorbent of the present invention. The useful degree of sulfation (DS) for such crosslinked cellulose is generally about 0.01 to 1.5 and preferably about 0.01 to 0.5, and there is no risk of partial dissolution in water of the cellulose sulfate fiber within the above DS range.

The starting cellulose fiber for such cellulose sulfate fiber may be any of the various ordinary fibers, and Egyptian and American cotton fibers can be mentioned as typical examples. Moreover, as the cellulose fiber, regenerated cellulose fibers such as viscose rayon and cuprammonium rayon fibers can also be employed.

Construction of a nonwoven fabric from cellulose sulfate fiber can be carried out by utilizing the well known techniques. While the principal material for the nonwoven fabric of the invention is cellulose sulfate fiber with an optional degree of sulfation, the nonwoven fabric of the invention may contain various other blendable fibers such as synthetic and/or semi-synthetic fibers, e.g. nylon, polyester, rayon and other fibers. Such starting fibers may be in a staple or filament form.

A nonwoven fabric is generally manufactured in two steps, namely the step of forming a fiber aggregate referred to generally as a web, sheet or mat and the step of bonding the fiber aggregate into an integral unit. The construction of a web, referred to above, is carried out by mixing and carding the fiber and passing the carded fiber through a web-forming machine such as a Rand webber. It is also possible to form a sheet directly, as in the spunbond system, using continuous filaments just extruded from a spinning nozzle.

Bonding of the formed web can be carried out either by the method utilizing the physical interlacing of fibers or by the method employing an adhesive. As examples of the former method, there can be mentioned the needle punching process (in which the fibers are interlaced by needle-punching the web) and the spunlace method (in which the fibers are interlaced by means of water jets or compressed air and thereby fixed, for instance). There are also available the paper-making process and the process in which yarns are passed into the web to bind it. Any of the above-mentioned processes, as a principle, fixes a fiber aggregate by utilizing the interlacing of fibers and does not introduce any material other than the fiber so that it is most suited for the manufacture of the nonwoven fabric comprising the adsorbent of the present invention. The latter method includes the process employing an aqueous emulsion adhesive and the process comprising mixing in a thermoplastic fiber and bonding the web under heat and pressure, among others. The nonwoven fabrics obtainable by the above processes can be utilized as the adsorbent of the invention depending on the biocompatibility and toxicity of the adhesive agent used and the void rate (porosity) of the fabric.

In the above manner can the desired nonwoven cellulose sulfate fabric-for use as the cFN adsorbent of the invention be obtained.

The method for fractional purification of FN according to the invention is now described in detail. This method comprises contacting an adsorbent comprising a nonwoven cellulose sulfate fabric with an FN-containing material. This method of contacting can be carried out by whichever of the batch process in which both members are caused to be present in one and the same system and of the filtration process in which the FN material is passed through a filter comprising a nonwoven cellulose sulfate fabric as a filter element but the filtration process is generally preferred from the standpoint of the ease of operation.

The filtration process comprises packing a suitable filter module housing with said nonwoven cellulose sulfate fabric in layers, equilibrating the filter module well with a suitable buffer solution such as 20 mM phosphate buffer (pH 7.0), loading said filter module with an FN material and recovering the object FN material as effluent or filtrate. In carrying out this process, adjusting the ionic strength of the FN load to a suitable value beforehand insures recovery of the FN material from which cFN has been selectively eliminated.

The adjustment of ionic strength can be carried out by adding a salt such as, for example, NaCl or using a buffer solution of high or low concentration. The suitable ionic strength is not particularly limited but can be liberally selected according to the kind of nonwoven cellulose sulfate fabric and the kind of salt used. When NaCl is employed, for instance, it is preferably selected from the concentration range of 0.1M to 0.5M in ordinary cases.

The amount of said nonwoven cellulose sulfate fabric can be appropriately selected according to its kind and the type of FN-material used for loading and is not particularly restricted. Generally, it can be suitably selected from the range of 0.5 to 10 g. The loading speed for the FN material with respect to the filter module is appropriately selected according to the type and geometry of filter module employed, among other factors, but is preferably selected from the range of about 1 to 50 ml/hr·cm$^2$ in most cases.

In this manner, cFN and pFN can be fractionally separated from an FN material in a very expedient manner and with good efficiency and, hence, pFN of high purity can be isolated to the exclusion of cFN.

Particularly when the method of this invention is applied to blood preparations, plasma fraction preparations, etc., cFN can be successfully eliminated from such preparations. Moreover, when the blood, plasma or the like is used as the substance to be treated, it is not necessary to carry out the above-mentioned adjustment of ionic strength and cFN can be eliminated by contacting the nonwoven cellulose sulfate fabric directly with the blood, plasma or the like. Therefore, this method can be applied to an extracorporeal circulation system. Thus, using a filter module constructed by laying up sheets of said nonwoven cellulose sulfate fabric therein as an adsorbent for plasma (or blood) components in combination with an ordinary extracorporeal circulation setup, cFN can be eliminated from the circulating blood. This application is hereinafter referred to as "hemocatharisis".

Except that it comprises the adsorbent of this invention and an appropriate means for contacting it with the blood or plasma separated therefrom, the above extracorporeal circuit may be otherwise freely constituted and configured. As said means, a module for adsorption of plasma components may be mentioned as an example. This module preferably comprises (1) a suitable housing made of a material which does not react with any substance occurring in blood, for example polycarbonate or polypropylene, preferably a cylindrical housing with an appropriate aspect ratio, which is equipped with an inlet for the blood to be treated and an outlet for treated blood, (2) the adsorbent of this invention as packed in said housing, and (3) filters having a porosity suited for the passage of blood as disposed at both openings of said housing. By assembling this module in the plasma separator or plasma component separator moiety of a double filtration plasma exchanger fitted with an extracorporeal circuit, an extracorporeal hemocatharisis device can be constructed. Of course, when the above module is used in place of the plasma separator for use as a hemocatharisis device, the circuit and parts constituting the plasma component separator need not be provided. When the module is used in place of the plasma component separator, the circuit and operation for replacement fluid are not needed.

By the method for fractional purification of FN according to the invention, only cFN can be effectively removed from the blood and this is a real breakthrough in that by applying the method to patients with collagen disease accompanied by vasculitis and presenting with increased blood cFN titers, such as those with rheumatoid arthritis, systemic lupus erythematosus, progressive systemic sclerosis, polymyositis, giant cell arteritis, polymyalgia rheumatica, polyarteritis nodosa, chronic renal failure or the like, symptomatic improvements can be obtained in such patients.

BEST MODE FOR CARRYING OUT THE INVENTION

The following reference examples and examples are intended to illustrate the present invention in further detail.

Reference Example 1 is a production example for the monoclonal antibody (HHS-01 antibody) specifically reactive to cFN, which was utilized in the assay of cFN for verifying the fractionation of cFN and pFN by the method of the invention, and Reference Example 2 pertains to the method for assay of cFN employing the above antibody.

Examples 1–4 are examples of production of the nonwoven cellulose sulfate fabric for use in the fractional purification of FN according to this invention and of the starting material thereof, Example 5 is an example of production of the nonwoven cellulose sulfate fabric from a nonwoven cellulose fabric, and Example 6 is an example of working the fractional purification of FN according to this invention.

It should be noted that in the respective examples, the total FN, albumin and total protein were determined by the following methods.

(Determination of Total FN)

An anti-FN monoclonal antibody [OAL-pF117, established using Sigma pFN as the immunogen; cf. Japanese Journal of Clinical Pathology, Vol. 35 Suppl., p. 119 (1987); The 18th Congress of International Association of Medical Laboratory Technologists, Abstracts, p. 225 (1988); etc.] was dissolved in Dulbecco's phosphate buffer (pH 7.2; hereinafter referred to briefly as D'PBS) at a final concentration of 2 µg/ml and the solution was distributed, 100 µl/well, into the wells of a 96-well plastic microtiter plate and allowed to stand at 4° C. overnight for conversion to a solid phase, which was then washed once with D'PBS [containing 0.05% of Tween 20; 300 µl/well]. Thereafter, each well was filled with 300 µl each of D'PBS, 0.05% thimerosal and 0.5% bovine serum albumin (BSA) and allowed to stand at 4° C. overnight for blocking. After blocking, the plate was washed once with D'PBS [containing 0.05% of Tween 20; 300 µl/well] and each well was filled with 100 µl of D'PBS [supplemented with 0.05% thimerosal, 10 mM EDTA, 0.1% BSA and 0.1% CHAPS] (buffer B). Furthermore, each well was filled with 20 µl each of the sample diluted 200-fold with buffer B and, as standard solutions, FN purified from normal human plasma and diluted to varying concentrations, and the plate was incubated at room temperature for 2.5 hours. The microtiter plate was then washed with five portions of D'PBS containing 0.05% of Tween 20.

Each well was further filled with 100 µl/well of a 5000-fold dilution (with use of buffer B after elimination of EDTA) of the anti-FN monoclonal antibody [OAL-pF115, established by using Sigma pFN as the immunogen; Japanese Journal of Clinical Pathology, Vol. 35 Suppl., p. 119 (1987); The 18th Congress of International Association of Medical Laboratory Technologists, Abstracts, p. 225 (1988); etc.] coupled to peroxidase by the periodate method (Willson and Nakane's method) and the plate was incubated for 2.5 hours and, then, washed 5 times with D'PBS containing 0.05% of Tween 20.

Then, 100 μl/well of o-phenylenediamine solution (OPD solution) was added and the reaction was carried out at room temperature for 10 minutes, at the end of which time the reaction was stopped with 100 μl of 2N sulfuric acid and the absorbance at 492 nm was measured. A calibration curve was constructed from the concentrations and absorbance values of standard FN solutions and the concentration of FN in the sample was determined from the calibration curve and the absorbance of the sample.

(Determination of Albumin)

The assay of albumin was made by the BCG method using a Hitachi 705 automatic analyzer (Hitachi, Ltd.) [reagent: ALB reagent art. no. 7022 (Kokusai Shiyaku), standard solution: Monitorol I (Baxter Healthcare Corporation, control serum)].

(Determination of Total Protein)

The total protein was determined by the biuret method using a Hitachi 705 automatic analyzer (Hitachi, Ltd.) [reagent: TP reagent art. no. 7677 (Kokusai Shiyaku), standard solution: Monitorol I (Baxter Healthcare Corporation, control serum).

REFERENCE EXAMPLE 1

Production of the Monoclonal Antibody (HHS-01)

(1) Preparation of an EcoRI-SacI cDNA Fragment Including the EDA Region of FN a) Amplification of the Human Fibroblast cDNA Library Using the cDNA library (Clonetek) prepared from the poly A+ RNA of human fibroblast cell line IMR-90 using lambda phage λgt11 as the vector, amplification of the phage was carried out by the plate lytic growth method.

Thus, 1 μl of a phage suspension from the above cDNA library was diluted with 99 μl of SM medium [1M NaCl, 20 mM MgSO$_4$·7H$_2$O, 50 mM Tris-HCl and 0.1% gelatin] and mixed with 100 μl of an overnight culture of *E. coli* LE392 in LB medium [1% Bacto trypton, 0.5% Bacto yeast extract and 0.5% sodium chloride] and the mixture was incubated at 37° C. for 10 minutes, whereby the-phage was adsorbed on the *E. coli*. To this was added 7.5 ml of a top agar solution [0.7% Bacto agar in LB medium] kept warm at about 50° C. and the mixture was overlayered on LB agar [LB medium containing 1.5% of Bacto agar] in a Petri dish 15 cm in diameter. After solidification of the top agar, culture was carried out at 37° C. overnight for phage amplification. Then, 15 ml of SM medium was poured on the top agar and the dish was incubated at 4° C. for 1 hour. The phage was recovered together with the top agar and centrifuged at 18000 rpm (Hitachi refrigerated centrifuge 20PR-52, RPR 20-2 rotors) for 10 minutes to remove the top agar and *E. coli*. To the phage-containing supernatant were added NaCl and polyethylene glycol at the final concentrations of 1M and 10%, respectively, and the mixture was allowed to stand on ice for 1 hour. The mixture was centrifuged again at 18000 rpm for 10 minutes to recover the phage as a pellet. This pellet was dissolved in 2 ml of 20 mM Tris-HCl (pH 7.5)-10 mM MgSO$_4$·7H$_2$O followed by addition of 20 μl of DNase I (10 mg/ml). The mixture was allowed to stand at room temperature for 30 minutes to lyze the free DNA and the same volume of chloroform was added and suspended for 5 minutes and centrifuged at 3000 rpm for 10 minutes to separate the water layer from the chloroform layer. The water layer was recovered and stirred well with the same volume of phenol to remove the coat protein from the phage particles, after which it was centrifuged at 3000 rpm for 10 minutes to transfer the phage DNA to the water layer. The water layer was extracted with the same volume of chloroform again and 0.2 volume of 3M sodium acetate solution and 2 volumes of ethanol were added to the water layer. The mixture was allowed to stand at –80° C. for 10 minutes and, then, centrifuged at 15000 rpm for 10 minutes to recover the phage DNA as a pellet. The DNA thus obtained was dissolved in TE buffer [10 mM Tris-HCl (pH 7.4)-1 mM EDTA) at a final concentration of 0.5 μg/μl and preserved at –20° C. The purity of phage DNA was verified by 1% agarose gel electrophoresis.

b) Synthesis of Primers

The following two oligodeoxynucleotide primers were prepared.

Upstream primer (EcoRI site)

5'-TCTCGGAATTCCATCACCCTCACC-3' (see SEQ ID No:1)

Downstream primer (SacI site)

5'-GGGGAGCTCCGAGCATTGTCATTC-3' (see SEQ ID No:1)

The above primers were synthesized from β-cyanoethylphosphoamidite derivatives of 4 different bases by the solid-phase method using an automatic DNA synthesizer (Applied Biosystems 380A). The deprotection and detachment from the solid phase of the synthesized oligodeoxynucleotide were carried out by warming in concentrated aqueous ammonia solution at 55° C. for 10 hours. The synthetic oligonucleotides thus prepared were purified by HPLC to give about 50 μg each of the desired oligonucleotides for use as the upstream and downstream primers. The resulting purified oligonucleotides were dissolved in TE buffer and preserved at –20° C.

c) Amplification of the EcoRI-SacI cDNA Fragment

A 1 μl portion of the TE buffer containing 0.5 μg of DNA as prepared in a) above was diluted with 1×PCR reaction buffer [20 mM Tris-HCl, pH 8.4; 50 mM KCl; 2.5 mM MgCl$_2$; 0.1 mg/ml nuclease-free bovine serum albumin] containing 20 pmol each of the upstream and downstream primers, followed by addition of 5 U of Taq polymerase (Perkin Elmer-Cetus, 1 μl). After 100 μl of mineral oil was overlayered, the mixture was subjected to 30 heating cycles of 1.5 minutes at 95° C., 3 minutes at 50° C. and 3 minutes at 72° C. to amplify the EcoRI-SacI cDNA fragment coding for the desired EDA region. The above reaction mixture was subjected to 1% agarose gel electrophoresis using the HaeIII-cut DNA fragments of ϕ×174 DNA as molecular weight markers in the presence of ethidium bromide to confirm that the object EcoRI-SacI cDNA fragment having the size of 1400 base pairs had been amplified.

d) Purification of the EcoRI-SacI cDNA Fragment

The EcoRI-SacI fragment isolated on the agarose gel in c) above was adsorbed on a DEAE-cellulose membrane (S & S, NA 45) by the method of Dretzen, G. M. et al. [Anal. Biochem., 112, 295–298 (1981)] and the adsorbed DNA fragment was then eluted from the DEAE-cellulose membrane with an eluent buffer [50 mM Tris-HCl, pH 8.0:1M NaCl; 10 mM EDTA] and precipitated with cold ethanol to recover the object EcoRI-SacI fragment (about 100 ng).

(2) Insertion of the EcoRI-SacI cDNA Including the EDA Region into the Protein A Expression Vector pRIT2T a) Preparation of the Plasmid Vector Two μg of protein A gene-fused vector pRIT2T (Pharmacia) was dissolved in 20 μl of EcoRI-SmaI reaction buffer [33 mM Tris-acetate, pH 7.9; 10 mM magnesium acetate; 66 mM potassium acetate; 0.5 mM dithiothreitol; 0.01% bovine serum albumin] followed by addition of 10 units each of EcoRI and SmaI. The mixture was incubated at 37° C. for 2 hours to cleave the plasmid DNA at EcoRI-SmaI sites. The reaction mixture was extracted with phenol and the cleaved DNA (about 1 µg) was recovered by ethanol precipitation.

b) Insertion of the PCR-amplified EcoRI-SacI cDNA Fragment into the Plasmid Vector In 20µl of EcoRI reaction buffer [50 mM Tris-HCl, pH7.5; 10 mM $MgCl_2$; 1 mM dithiothreitol; 100 mM NaCl] was dissolved 100 ng of the EcoRI-SacI cDNA fragment purified in (1)-d) above, followed by addition of 5 U of EcoRI, and the mixture was incubated at 37° C. for 3 hours to expose the 5' end EcoRI site of the amplified EcoRI-SacI fragment. The reaction mixture was then extracted with phenol and after addition of 20 ng of the pRIT2T plasmid cleaved at the EcoRI-SmaI site which was prepared in (2)-a), cold ethanol precipitation was carried out to recover the DNA. This DNA was dissolved in 24 µl of ligation buffer [66 mM Tris HCl, pH 7.6; 5 mM $MgCl_2$; 5mM dithiothreitol; 1 mM ATP] followed by addition of 300 U of T4 DNA ligase (Takara Shuzo), and the mixture was incubated at 16° C. for 16 hours to insert the EcoRI-SacI cDNA fragment encoding the EDA region of FN in the EcoRI-SacI site of pRIT2T.

c) Construction of the Transformant

A 1 µl portion of the reaction mixture obtained in b) above was mixed with 100 µl of *E. coli* HB101 competent cells (Takara Shuzo) and the mixture was maintained under ice-cooling for 30 minutes and incubated at 42° C. for 90 seconds to introduce the plasmid DNA into the *E. coli*.

To this mixture was added 1 ml of LB medium and shake culture was carried out at 37° C. for 1 hour. Then, 100 µl of the culture was inoculated on LB agar medium containing 50 µg/ml of ampicillin and the inoculated agar was incubated at 37° C. for 14 hours to obtain about 50 colonies of *E. coli* transfected by the plasmid DNA. From among them, 12 colonies were randomly harvested and cultured in LB medium containing 50 µg/ml of ampicillin. Then, in accordance with the method of Birnboim and Doly as modified [Molecular Cloning, A Laboratory Manual, T. Maniatis et al., edit., 368–369 (1982)], the plasmid DNA was recovered from each colony. This DNA was double-digested with EcoRI and BamHI and a plasmid clone (pEDA1) having the predicted insert sequence of about 1400 base pairs was selected.

(3) Expression and Isolation of the Protein A-EDA Fused Protein a) Introduction of Plasmid pEDA1 into *E. coli* N4830

The pEDA1 plasmid DNA obtained in (2) above was introduced into *E. coli* N4830 (obtained from Pharmacia) in accordance with the calcium phosphate method of Mandel and Higa [J. Mol. Biol., 53, 154 (1970)], as follows.

Thus, *E. coli* N4830 was shake-cultured in 100 ml of LB medium at 37° C. and when the cell density reached about $5 \times 10^7$/ml, the incubation was terminated and the culture was quenched in an ice bath. The quenched culture was centrifuged at 4000×g (4° C.) for 5 minutes to harvest the cells. The pellet was suspended in 50 ml of ice-cooled 50 mM calcium chloride-10 mM Tris-HCl (pH 8.0) and the suspension was allowed to stand in an ice bath for 15 minutes and, then, centrifuged at 4000×g (4° C.) for 5 minutes. The resulting pellet was resuspended in 7 ml of an ice-cooled solution of 50 mM calcium chloride-10 mM Tris-HCl (pH 8.0) and the suspension was allowed to stand in an ice bath. To 0.2 ml of the *E. coli* cell suspension thus prepared was added 10 µl of a solution of pEDA1 in TE buffer (containing 10 ng of plasmid DNA) and the mixture was allowed to stand in an ice bath for 30 minutes, after which it was warmed in a water bath at 42° C. for 2 minutes. After 1 ml of LB medium was added, the mixture was incubated at 37° C. for 1 hour. The *E. coli* cell suspension thus obtained, 100 µl, was spread on an ampicillin-containing LB agar medium and incubated at 37° C. for 14 hours to cause production of transformant *E. coli* colonies.

b) Isolation of the Protein A-EDA Fused Protein

The transformant obtained in a) above (*E. coli* N4830 transfected with plasmid pEDA 1) was shake-cultured in 500 ml of LB medium at 30° C. for 14 hours, and after 500 ml of LB medium warmed to 54° C. beforehand was added, shake culture was further continued in a water bath at 42° C. for 90 minutes to induce expression of the protein A-EDA fused protein.

The culture was centrifuged at 5000×g (4° C.) for 15 minutes to recover the cells, which were then suspended in 100 ml of ice-cooled Tris-buffered physiological saline [50 mM Tris-HCl (pH 7.6), and 150 mM NaCl] and disrupted by sonication (Branson Sonifier 250; 3 cycles of 3-minute treatment at output setting 7) in an ice bath to thereby release the protein from the cells. About 100 ml of this fluid was centrifuged (16000×g, 20 minutes, 4° C.) to recover about 95 ml of a supernatant fraction. This fraction was diluted with 300 ml of Tris-buffered physiological saline (pH 7.4) and applied to a column packed with about 10 ml of IgG-sepharose 6 Fast Flow (Pharmacia) for adsorption of the protein A-EDA fused protein on the column. This column was washed with 100 ml of Tris-buffered physiological saline (pH 7.4) and 20 ml of 5 mM ammonium acetate solution (pH 5.0) in that order and the adsorbed protein was eluted with 0.5M acetic acid solution. The protein A-EDA fused protein was dialyzed against Tris-buffered physiological saline (pH 7.4) for 48 hours to give about 1 mg of the object antigen.

(4) Preparation of the Hybridoma

The purified protein A-EDA fused protein obtained in (3) above, 0.05 mg, was diluted with 0.5 ml of PBS and emulsified with the same quantity of complete Freund's adjuvant. The resulting emulsion was administered intradermally in 0.2 ml portions to male Balb/c mice (aged 8 weeks). The animals were immunized by further 4 similar doses given at 2-week intervals and the spleen was excised 3 days after the last immunization.

Splenic cells were isolated from the excised spleen and the erythrocytes present among the cells were removed by 1–2 minute lysis with 0.83% ammonium chloride solution at 4° C. The cells thus obtained were collected as sensitized lymphocytes and washed three times with RPMI-1640 medium previously warmed to 37° C.

Then, mouse myeloma cells [P3U1, Current Topics in Microbiology and Immunology, 73, 3 (1981)] was subcultured in a medium prepared by adding 100 µM of 8-azaguanine to RPMI-1640 supplemented with 15% FCS (fetal calf serum) and the cultured cells, designated as myeloma cells, were washed.

The above sensitized lymphocytes were mixed with the myeloma cells in a cell count ratio of 10:1 in a 50 ml tube and the resulting cell mixture was centrifuged at 500×g for 5 minutes. The supernatant was thoroughly removed with a Pasteur's pipet. The above procedure was carried out in a water bath-maintained at 37° C.

Then, 4 ml of 35% polyethylene glycol 1500 (Wako Pure Chemical; PEG) was added and the mixture was stirred gently for 1 to 2 minutes and allowed to stand for 1 minute, at the end of which time 2 ml of FCS-free RPMI-1640 medium, prewarmed to 37° C., was gradually added over a period of about 1 minute. The mixture was allowed to stand for 1 minute and 4 ml of the same medium was further added. After further 2-minute standing, 4 ml of the same medium was further added and the mixture was allowed to stand for 4 minutes. Thereafter, 8 ml of RPMI-1640 containing 15% FCS, 0.05 U (potency)/l of streptomycin sulfate, 60000 U/l of penicillin G potassium, 54 mg/l of gentamicin and 1 ml of sodium pyruvate (hereinafter referred to as complete RPMI-1640 medium), warmed to 37° C. beforehand, was added to the mixture over a period of 2 to 3 minutes. The mixture was then centrifuged at 500×g for 5 minutes. The supernatant was aspirated off and the splenocytes were suspended in complete RPMI-1640 medium, prewarmed to 37° C., at a concentration of 1×10^6 cells/ml. This suspension was then distributed, 0.1 ml per well, into the wells of a 96-well microtiter plate (Costar) and cultured in an incubator controlled at 37° C., 5% $CO_2$ and 100% RH for 24 hours. Thereafter, each well was filled with 0.1 ml of 10% FCS-added complete RPMI-1640 medium containing $1\times10^{-4}$M hypoxanthine, $4\times10^{-7}$ aminopterin and $1.6\times10^{-5}$M thymidine (hereinafter referred to as HAT medium). On the 2nd and 3rd days, 0.1 ml each of the supernatant was aspirated and 0.1 ml each of fresh HAT medium was added instead. This change of medium was further performed every 2 to 3 days. On the 6th day, the supernatant was similarly aspirated and complete RPMI-1640 medium containing $1\times10^{-4}$M hypoxanthine and $1.6\times10^{-5}$M thymidine (hereinafter referred to as HT medium) was substituted. Thereafter, growth was maintained in complete RPMI-1640 medium.

After the cell fusion by the above procedure, colonies became grossly visible in 10 to 14 days. Starting when the cells had occupied one-quarter of the bottom surface area of the 96-well plate, the culture supernatant was tested by the enzyme-linked immunosorbent assay (ELISA) using an EDA-carrying human placental FN as the antigen and from the positive well, hybridoma cloning was immediately performed by the limiting dilution method [Methods in Enzymology 73, 3 (1981)]. Thus, using 20 ml of a 10% FCS-added RPMI-1640 medium prepared to contain $1\times10^8$ Balb/c mouse thymic cells, cloning was performed by seeding a 96-well plate with 0.2 ml portions of the hybridoma at the rates of 3 cells/well, 1 cell/well and 0.3 cell/well to establish the object hybridoma.

The above cloning was performed 4 times with monitoring to confirm lack of reactivity with plasma FN using, as an indicator, the reactivity with the placental FN and cellular FN purified from a culture supernatant of the WI-38VA13 cell line which had been established by infecting the human normal fibroblast cell line WI-38 with the tumor virus SV40. By the above procedure was obtained a hybridoma producing the monoclonal antibody with the desired reaction selectivity. This hybridoma clone was designated as HHS-01.

The clone HHS-01 obtained above was cultured in complete RPMI-1640 medium under the conditions of 5% $CO_2$ and 37° C. for 96 hours. The resulting culture was centrifuged at 3,000 rpm for 10 minutes to obtain a culture supernatant containing the object monoclonal antibody.

The thus-selected clone (hybridoma HHS-01 producing the antibody) has been deposited with the Fermentation Research Institute of the Agency of Industrial Science and Technology under the designation of HHS-01 and the accession number of FERM BP-3297.

The above clone HHS-01 was intraperitoneally administered in a dose of 1×10^6 to Balb/c mice which had been inoculated with pristane (Aldrich). After 5 to 10 days, the accumulated ascitic fluid was harvested to recover an ascitic fluid containing the antibody. The antibody in the ascites was purified by affinity chromatography using protein A-Sepharose to give a purified HHS-01 antibody.

The subclass of this antibody as determined by the method of Ouchterlony using a monoclonal antibody typing kit (Binding, code RK008) was $IgG_{2a}$.

REFERENCE EXAMPLE 2

Method for Assay of cFN

The purified HHS-01 antibody obtained in Reference Example 1 was dissolved in D'PBS (pH 7.2) at a concentration of 2 μg/ml and this solution was distributed into the wells of a 96-well plastic microtiter plate in portions of 100 μl/well and allowed to stand at 4° C. overnight for conversion to solid phase. The plate was then washed with D'PBS [containing 0.05% of Tween 20, 300 μl/well, once]. Then, each well was filled with 300 μl each of D'PBS, 0.05% thimerosal and 0.5% BSA and allowed to stand at 4° C. overnight for blocking. After blocking, the wells were washed with D'PBS [containing 0.05% of Tween 20, 300 μl/well, once] and each well was filled with 100 μl of 0.1M phosphate buffer [0.05% thimerosal, 10 mM EDTA, 20% normal goat serum and 1% normal mouse serum, pH 6.0] (buffer A). Then, each well was filled with 20 μl each of the sample solution and, as a standard solution, the cFN-purified from a culture supernatant of the cell line WI-38VA13, which had been obtained by infecting the human normal fibroblast cell line WI-38 with a tumor virus, and diluted at a varying concentration were added and the mixture was incubated at room temperature for 2.5 hours. The mixture was, then, washed 5 times with D'PBS containing 0.05% of Tween 20. Then, each of the wells was filled with 100 μl of the 5,000-fold buffer dilution (the buffer A after elimination of EDTA) of the anti-FN monoclonal antibody [OAL-pF115] coupled to peroxidase by the periodate method and the mixture was incubated for 2.5 hours and washed 5 times with D'PBS containing 0.05% of Tween 20.

Then, 100 μl/well of OPD solution was added and the reaction was conducted at room temperature for 10 minutes. The reaction was terminated with 100 μl of 2N sulfuric acid and the absorbance at 492 nm was measured. A calibration curve was constructed from the concentrations and absorbance values of standard FN dilutions and the concentration of FN in the sample was determined from the calibration curve and the absorbance reading of the sample.

EXAMPLE 1

Preparation of Cellulose Sulfate Fiber

Chlorosulfonic acid, 10 ml, was dripped into 100 ml of pyridine under ice-cooling. In this mixture, 1 g of Egyptian cotton (long staples of cotton of Egyptian origin with JIS L-1015 yarn test net purity 0.96 denier and mean fiber length 31.7 mm) was immersed and the reaction was carried out 60° C. for a predetermined time. Then, the whole system was neutralized with 18% aqueous solution of NaOH under ice-cooling. The fiber was taken out from the reaction bath and washed serially with water and ethanol to provide a cellulose sulfate fiber.

The reaction conditions and the sulfur content (wt %) and DS values of the resultant cellulose sulfate fibers are shown in Table 1.

TABLE 1

| Sample code | Reaction temperature (°C.) | Reaction time (hr) | Sulfur content (%) | DS (—$SO_3$Na) |
|---|---|---|---|---|
| M-1 | 60 | 0.5 | 1.33 | 0.07 |
| M-2 | 60 | 1 | 1.51 | 0.08 |

EXAMPLE 2

Preparation of Cellulose Sulfate Fiber

Egyptian cotton, 2 g, was immersed in 200 ml of dimethylformamide. To this bath was added 20 g of $SO_3$-DMF complex and the reaction was conducted at a predetermined temperature for a predetermined time. After completion of the reaction, after-treatment was carried out as in Example 1 to provide a cellulose sulfate fiber.

The reaction conditions and results were tabulated in the same format as Table 1, as shown in Table 2.

TABLE 2

| Sample code | Reaction temperature (°C.) | Reaction time (hr) | Sulfur content (%) | DS (—SO₃ Na) |
| --- | --- | --- | --- | --- |
| U-1 | 25 | 1 | 0.79 | 0.04 |
| U-2 | 25 | 2 | 0.96 | 0.05 |
| U-3 | 25 | 3 | 1.68 | 0.09 |
| u-1 | 60 | 1 | 5.6 | 0.35 |
| u-2 | 60 | 2 | 9.3 | 0.67 |

EXAMPLE 3

Preparation of Crosslinked Cellulose Sulfate Fiber

Egyptian cotton, 1 g, was immersed in 50 ml of methanol. To this bath was added 0.5 g of an aqueous alkali solution containing 0.25 g of sodium hydroxide with stirring. Thereafter, the system was allowed to stand at room temperature for 2 hours and the Egyptian cotton was taken out and drained on a glass filter G3. The wet Egyptian cotton was transferred to 50 ml of acetone-dimethyl sulfoxide (1:1) and following addition of 0.57 g of epichlorohydrin, the whole system was allowed to stand at 65° C. for 15 hours. After completion of the reaction, the cotton was taken out, washed with acetic acid-water, rinsed and dried.

The resultant crosslinked cotton was sulfated by the same procedure as described in Example 2 to provide a crosslinked cellulose sulfate fiber.

The reaction conditions and results were tabulated in the same format as Table 1, as shown in Table 3.

TABLE 3

| Sample code | Reaction temperature (°C.) | Reaction time (hr) | Sulfur content (%) | DS (—SO₃ Na) |
| --- | --- | --- | --- | --- |
| UC-4 | 25 | 3 | 3.19 | 0.18 |
| UC-5 | 25 | 6 | 4.33 | 0.24 |
| UC-6 | 25 | 8 | 5.20 | 0.32 |
| UC-7 | 60 | 3 | 7.50 | 0.50 |
| UC-8 | 60 | 5 | 11.30 | 0.89 |
| UC-9* | 25 | 17 | 15.20 | 1.49 |

*UC-9: The reaction was carried out using 60 g of SO₃-DMF complex.

*: UC-9: The reaction was carried out using 60 g of S03-DMF complex.

EXAMPLE 4

Preparation of Nonwoven Cellulose Sulfate Fabric

Using the cellulose sulfate fibers obtained in Examples 1–3, nonwoven fabrics were fabricated as follows. Thus, each of the above-mentioned fibers was shorn to lengths within the range of 5–15 mm using a pair of scissors. The shorn fibers, 6.25 g, were then dispersed in 500 ml of water using a blender. The above dispersion was diluted with 21 l of water and the whole amount was filtered through a stainless steel screen of 25×25 cm square meshes, 180 mesh. In this manner, a paper-like aggregate of cellulose sulfate was obtained on the stainless steel screen. The nonwoven fabric available after drying was like Japanese paper, weighing 100 g/m². The sample thus obtained was designated Code I.

On the other hand, the same shorn cellulose sulfate fibers as used above were beated using a PFI beating mill. The beating conditions were as follows. Beating linear pressure 1.8 g/cm; beating pitch 0.2 mm; beating surface relative speed 6 m/s; beating concentration 6%; beating counter (×10 revolutions) 200.

The beated cellulose fiber was then formed into a sheet in the same manner as above. The resultant paper-like product looked like a dense filter paper and weighed 100 g/m². The sample thus obtained was designated Code II.

EXAMPLE 5

Preparation of Nonwoven Cellulose Sulfate Fabric

Egyptian cotton was processed into a continuous web using a webbing machine and, then, subjected to treatment with water jets for fiber interlacing by the water jet span lace technique. A 1-gram sample of the resultant nonwoven fabric weighing 60 g/m² was immersed in 50 ml of methanol and the bath was supplemented with 0.5 g of 50 w/w % aqueous solution of sodium hydroxide. The whole system was allowed to stand at room temperature for 2 hours, after which the nonwoven fabric was taken out, drained and transferred to 50 ml of acetone-dimethyl sulfoxide (1:1). To this bath was added 0.57 g of epichlorohydrin and the reaction was carried out at 65° C. for 15 hours to provide a crosslinked nonwoven fabric.

One gram each of the uncrosslinked nonwoven fabric and the crosslinked nonwoven fabric obtained above were respectively immersed in 100 ml of dimethylformamide, followed by addition of SO₃-DMF complex in a predetermined amount, and the reaction was conducted at room temperature for a predetermined time. After completion of the reaction, the product was treated in the same manner as described in Example 1 to provide a nonwoven cellulose sulfate fabric.

The reaction conditions and results are shown in Table 4. In Sample code column of the table, FC represents the crosslinked version of nonwoven cellulose sulfate fabric and F represents the uncrosslinked version of nonwoven cellulose sulfate fabric.

TABLE 4

| Sample code | SO₃-DMF complex (g) | Reaction time (hr) | Sulfur content (%) | DS (—SO₃ Na) |
| --- | --- | --- | --- | --- |
| F-1 | 1.0 | 0.083 | 0.294 | 0.015 |
| F-2 | 1.0 | 0.25 | 0.771 | 0.04 |
| F-3 | 2.0 | 0.25 | 1.37 | 0.073 |
| F-4 | 2.0 | 0.50 | 1.369 | 0.072 |
| FC-1 | 7.5 | 1 | 2.75 | 0.15 |
| FC-2 | 7.5 | 2 | 4.09 | 0.24 |

EXAMPLE 6

FN Adsorption Test

The nonwoven fabrics obtained in Examples 4 and 5 were subjected to an FN adsorption test using the test plasma prepared in the following manner.

<Preparation of Test Plasma>

A fresh frozen human plasma was reconstituted at 37° C. followed by addition of 3 U/ml heparin and 10 mM calcium chloride. To this plasma was added 8 μg/ml of cFN obtained from a culture supernatant of WI-38VA13 cells derived by cancerating WI-38, a human normal fibroblast cell line, with a tumor virus to provide a test plasma (prepared extemporaneously).

The above adsorption test was carried out as follows. First, 60 ml (Test 1) or 400 ml (Test 2) of the test plasma was added to 1 g of each test nonwoven fabric, followed by quick shaking at 30° C. for 4 hours. The supernatant was then collected and the amounts of respective components (concentrations, A) were determined. Concurrently, the same procedure was carried out without using the nonwoven fabric but using the test plasma only and the amounts of respective components (concentrations, T) in the supernatant were similarly determined. Then, the adsorptions (%) of FN and other components were calculated by means of the following equation.

Adsorption of each component (%)=(T−A)/T×100

The results are shown in Table 5 (for 60 ml test plasma) and Table 6 (for 400 ml test plasma).

TABLE 5

Test 1. Adsorption test with 60 ml test plasma/g nonwoven fabric

| Nonwoven fabric tested | Adsorption of plasma components (%) | | | | |
|---|---|---|---|---|---|
| | DS | cFN | Total FN | Albumin | Total protein |
| U-1-I | 0.04 | 87 | 61 | 2 | 3 |
| U-1-II | 0.04 | 91 | 65 | 2 | 3 |
| U-2-I | 0.05 | 88 | 60 | 2 | 3 |
| U-2-II | 0.05 | 89 | 60 | 2 | 3 |
| M-1-I | 0.07 | 81 | 27 | 1 | 1 |
| M-1-II | 0.07 | 89 | 33 | 1 | 2 |
| M-2-I | 0.08 | 76 | 20 | 2 | 1 |
| M-2-II | 0.08 | 87 | 27 | 0 | 1 |
| U-3-I | 0.09 | 86 | 20 | 0 | 1 |
| U-3-II | 0.09 | 88 | 20 | 0 | 2 |
| UC-4-I | 0.18 | 70 | 14 | 2 | 1 |
| UC-4-II | 0.18 | 65 | 10 | 3 | 4 |
| UC-5-I | 0.24 | 70 | 19 | 2 | 3 |
| UC-5-II | 0.24 | 79 | 22 | 1 | 2 |
| UC-6-I | 0.32 | 71 | 19 | 2 | 3 |
| UC-6-II | 0.32 | 72 | 18 | 1 | 3 |
| Control nonwoven fabric | 0.00 | 7 | 0 | 0 | 0 |

TABLE 6

Test 2. Adsorption test with 400 ml test plasma/g nonwoven fabric

| Nonwoven fabric tested | Adsorption of plasma components (%) | | | | |
|---|---|---|---|---|---|
| | DS | cFN | Total FN | Albumin | Total protein |
| F-1 | 0.015 | 67 | 12 | 2 | 1 |
| F-2 | 0.04 | 72 | 29 | 0 | 1 |
| U-1-I | 0.04 | 71 | 18 | 1 | 1 |
| U-1-II | 0.04 | 51 | 14 | 1 | 1 |
| U-2-I | 0.05 | 71 | 17 | 1 | 1 |
| U-2-II | 0.05 | 68 | 20 | 1 | 1 |
| M-1-I | 0.07 | 73 | 12 | 1 | 1 |
| M-1-II | 0.07 | 68 | 8 | 1 | 1 |
| M-2-I | 0.08 | 76 | 15 | 1 | 0 |
| M-2-II | 0.08 | 52 | 12 | 0 | 0 |
| U-3-I | 0.09 | 39 | 7 | 0 | 1 |
| U-3-II | 0.09 | 42 | 9 | 0 | 0 |
| UC-4-I | 0.18 | 66 | 17 | 0 | 0 |
| UC-4-II | 0.18 | 57 | 13 | 1 | 1 |
| UC-5-I | 0.24 | 71 | 21 | 1 | 0 |
| UC-5-II | 0.24 | 70 | 18 | 2 | 1 |
| UC-6-I | 0.32 | 68 | 18 | 2 | 1 |
| UC-6-II | 0.32 | 68 | 17 | 1 | 0 |
| Control nonwoven fabric | 0.00 | 8 | 0 | 0 | 0 |

It is apparent from Tables 5 and 6 that with any of the nonwoven cellulose sulfate fabrics, cFN is adsorbed at a high rate.

Furthermore, when the test plasma was added in relatively small amounts to a given amount of uncrosslinked nonwoven cellulose sulfate fabric, the % adsorption of total FN decreased with an increased DS value as seen in Table 5, indicating that cFN can be eliminated from plasma with improved selectivity and higher yield. However, when the DS value is increased too high, the adsorption of cFN itself tends to decrease somewhat.

When the uncrosslinked nonwoven cellulose sulfate fabric is used to treat a large quantity of test plasma, the % adsorption of total FN is low even with the nonwoven fabric having a low DS value as seen in Table 6, indicating that cFN can be adsorptively eliminated from the plasma with greater selectivity. However, compared with the case in which a small quantity of test plasma was treated, the % adsorption of cFN decreased somewhat and this tendency was more remarkable for nonwoven fabrics having higher DS values.

On the other hand, in the case of crosslinked nonwoven cellulose sulfate fabrics, the % adsorption of cFN was constant and the selectivity is higher irrespective of the quantity of test plasma treated, 60 ml/g or 400 ml/g.

It is clear from the above findings that the proper DS value can be selected according to the treating conditions and objective of treatment. The crosslinking treatment does not reduce the rate of cFN adsorption and is useful for the manufacture of nonwoven cellulose sulfate fabrics having high DS values.

We claim:

1. An adsorbent for cellular fibronectin comprising a non-water-dispersible nonwoven cellulose sulfate fabric made of a crosslinked cellulose sulfate fiber with a degree of sulfation within the range of 0.01 to 1.5.

2. The adsorbent according to claim 1 wherein the nonwoven cellulose sulfate fabric is a nonwoven fabric constructed after sulfation of cellulose fiber.

3. The adsorbent according to claim 1 wherein the nonwoven cellulose sulfate fabric is a sulfated nonwoven fabric of cellulose fiber.

* * * * *